(12) United States Patent
Jensen et al.

(10) Patent No.: US 11,478,002 B2
(45) Date of Patent: *Oct. 25, 2022

(54) FOOD PRODUCT AND COATING

(71) Applicant: Conagra Foods RDM, Inc., Chicago, IL (US)

(72) Inventors: Michael Jensen, Omaha, NE (US); Jenny V. Bermudez Lopez, Omaha, NE (US); Kirsten Fletter, Omaha, NE (US); Jacqueline Mathews, Auburn, MA (US); Clinton L. Johnson, Omaha, NE (US)

(73) Assignee: Conagra Foods RDM, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,442

(22) Filed: Jun. 15, 2020

(65) Prior Publication Data
US 2020/0375229 A1 Dec. 3, 2020

Related U.S. Application Data

(63) Continuation of application No. 13/656,866, filed on Oct. 22, 2012, now Pat. No. 10,681,929, and a continuation of application No. 13/656,805, filed on Oct. 22, 2012, now Pat. No. 10,681,928.

(60) Provisional application No. 61/600,012, filed on Feb. 17, 2012.

(51) Int. Cl.
*A23L 7/191* (2016.01)

(52) U.S. Cl.
CPC .................................. *A23L 7/191* (2016.08)

(58) Field of Classification Search
None
See application file for complete search history.

(56) References Cited

U.S. PATENT DOCUMENTS

| 4,910,031 A * | 3/1990 | Budd | A23P 20/12 426/102 |
| 2004/0219280 A1 * | 11/2004 | Green | A23L 7/126 426/618 |
| 2010/0233346 A1 * | 9/2010 | Redl | A23L 7/126 426/625 |
| 2011/0183046 A1 * | 7/2011 | Nack | A23L 7/191 426/94 |

* cited by examiner

*Primary Examiner* — Jenna A Watts
(74) *Attorney, Agent, or Firm* — Ryan T. Grace; Advent, LLP

(57) ABSTRACT

The coating can have a low-sweetness perception. During manufacturing and processing, the coating maintains a flowability to allow a glaze state of the coating to be applied to a food. Upon cooling, the glaze state of the coating forms a glass state that provides a low-sweetness impact which facilitates application of savory taste perceptions.

20 Claims, 5 Drawing Sheets

US 11,478,002 B2

FOOD PRODUCT AND COATING

RELATED APPLICATIONS

The present application is a continuation under 35 U.S.C. § 120 of U.S. patent application Ser. Nos. 13/656,805 (now U.S. Pat. No. 10,681,917) and 13/656,866 (now U.S. Pat. No. 10,681,929), each of which in turn claims the benefit under 35 U.S.C. § 119(e) of U.S. Provisional Application Ser. No. 61/600,012 filed Feb. 17, 2012, entitled FOOD PRODUCT AND COATING. The aforementioned is incorporated by reference herein in its entirety.

BACKGROUND

Coatings are frequently utilized with foods. Coatings on foods are many times sweet. In some situations, this sweet flavoring is desired. Yet, sweet coatings may not be acceptable for several types of food and/or desired taste perceptions.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure pertain to a coating for food and a food product having the coating. The coating can have a low-sweetness perception. During manufacturing and processing, the coating maintains a flowability to allow a glaze state of the coating to be applied to a food. Upon cooling, the glaze state of the coating forms a glass state that provides a low-sweetness impact which facilitates application of savory taste perceptions.

DRAWINGS

DETAILED DESCRIPTION

Figure 1:
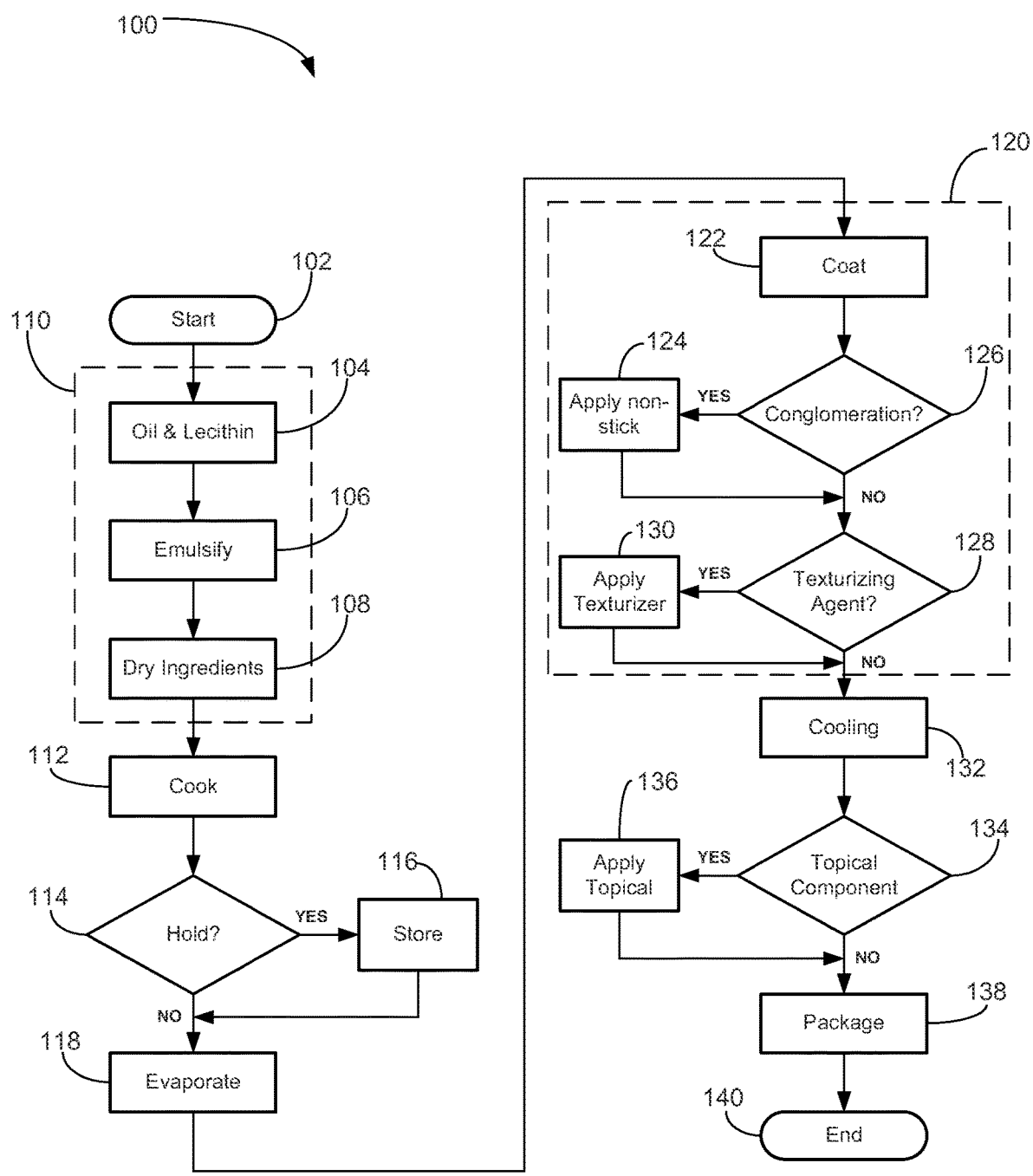
FIG. 1 is an example operational flow diagram indicating example features associated with a coating for a food product.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be embodied as formulations, food products, processes, processes for making food products, and processes for making formulations. The following detailed description is, therefore, not to be taken in a limiting sense.

Coatings are used on food for a variety of reasons. For example, coatings can be utilized to import certain desired organoleptic properties to the food. Such organoleptic properties can include a desired taste, texture, and mouth-feel.

Various types of foods include coatings. For example, foods that utilize coatings can include puffed snacks, expanded snacks, popped snacks, baked snacks, fried snacks, and/or the like. These foods can have a carbohydrate base such as a grain base, a cereal base, a bread base, a pasta base, a bean base, a potato base, a bran base, a rice base, and/or the like. Furthermore, such foods can have several forms. Such snacks can include individual snack pieces, a conglomeration of individual pieces, snack bars, and the like.

An exemplary type of coated food includes packaged popped popcorn. For example, kettle corn and caramel corn utilize a sweet coating which imparts a sweet flavor. The sweetness in such coatings is generally attributed to the ingredients found in the coating's formulation. For example, kettle corn and/or caramel corn usually include non-reducing sugars, liquid and/or solid sugars, brown sugars, corn syrups, caramel, and other ingredients that elevate the sweetness perception.

Along with the elevated sweetness perception, the sugar based ingredients may affect the coating system in other ways. For example, the sugar facilitates a workable glaze for application to the food product. After being heated to the glaze state, the glaze maintains a workable viscosity at a large range of temperatures. This workable viscosity not only provides flowability through processing equipment, but also allows for ease of application to the food product. Stated another way, temperature ranges for maintaining the glaze state can have large tolerances.

As another example associated with the affects of the sugar base on the overall coating system, sugar is known to be a good glass forming agent. As the glaze state of the sugar based coating cools, a glass is formed. This glass helps contribute to the candy type texture indicative of many coated snack foods.

The sweetness imparted by the sugar based coating, however, is not always a desirable attribute of a coating. For example, if the food is already high in sugar content, the addition of high sucrose sugar based coating can be unhealthy. In other situations, sweet flavors may be undesirable and savory flavors may be desirable. Yet, if a sugar based coating is utilized with a savory flavoring, it has been found that the sweetness can counteract the savory flavor and provide an undesirable taste perception. Furthermore, if the sugar base is removed or eliminated, it has been found that processing and textural problems arise because the viscosity of the materials becomes unmanageable and a glass state may not properly form to provide a texture to the end product.

As more fully set forth below, aspects of the disclosure pertain to a coating and food product that has a glassy or "candy" type coating (which is typically associated with a sweet taste perception); yet, the coating is formulated to provide a low-sweetness perception. The coating can function as a binder to facilitate the adherence of texturizing particulates to enhance a textural perception. A savory flavoring can be applied to the coating because of the low-sweetness perception. When the finished food product is consumed, the consumer perceives a crunchy candy texture from the coating and/or texturizing agent along with a savory taste perception from the coated food piece and any savory flavorings. The combination provides a nutritive candy crunchy texture and a low-sweetness or savory taste perception.

Along with the textural and flavor combination facilitated by the coating, the coating also maintains processability during industrial applications. For example, the coating formulation overcomes flowability problems associated with using typical viscous and sticky, sweet type ingredients such as sucrose or corn syrup at high temperatures. Also, such sweet type ingredients are typically good glass forming agents. In situations where sweet ingredients are reduced, coatings can have unworkable rheological properties and poor glass formation that make the coatings difficult to manage in industrial settings. The coating herein provides the combination of the low-sweetness perception, the candy/glass forming abilities, along with a manageable flowability at high temperatures to allow industrial application of the coating to produce savory food products.

I. GENERAL TERM USAGE

The general term usages below are indicated herein for ease of review of the specification below. The usage is not meant to be a static definition of any of the terms and/or override any meaning of the terms that can be found in this document as a whole. The usage of any of the terms can part from the general term usage indicated below based on the totality of the language of the specification, context, claims, and ordinary meaning of terms.

The term "coating" can refer to a formulation applied to the surface of a food. The term coating can encompass a single layered coating, a multi-layered coating, and multiple-layered coatings having different compositions. The coating can function to coat a food product. In some aspects, the coating can also function to bind flavor and textural particulates to the food product.

The term "low moisture" can refer to a food product having a moisture content less than about 15%. The moisture content can be less than about 15%, 14%, 13%, 12%, 11%, 10%, 9%, 8%, 7%, 6%, 5%, 4%, 3%, 2%, and 1%.

The term "shelf stable" can refer to a food product that can be stored at room temperature without substantially adversely affecting the organoleptic properties of the food product and without supporting significant microbial growth. For example, the food product can be stored at room temperature without substantially adversely affecting the organoleptic properties for at least 180 days.

The term "carbohydrate based" can refer to food products that are primarily formed from complex carbohydrates such as grains, cereals, breads, pastas, beans, potatoes, bran, rice, and/or the like. In one example, the term "carbohydrate based" can refer to a food product that is at least about 50% carbohydrate by dry weight. For example, the food product can be at least about 50%, 55%, 60%, 65%, 70%, 75%, 80%, 85%, 90%, 95%, 100% carbohydrate by dry weight.

The term "dextrose equivalent" can indicate a quantitative measure of the degree of starch polymer hydrolysis. Dextrose equivalent can be a measure of reducing power compared to a dextrose standard of 100. Products with higher dextrose equivalent have a greater extent of starch hydrolysis. As products hydrolyze (e.g., dextrose equivalent increases) the average molecular weight typically decreases and the carbohydrate profile changes accordingly. Sweetness can increase as the dextrose equivalent increases.

The term "coating formulation" can refer to the ingredients and percentages of ingredients that make up the coating apart from any food product, texturizing agents, and/or topical components in which the coating formulation may be associated.

The term "hydrated state" in relation to the "coating formulation" can refer to the state of the coating formulation up to operation 118 in FIG. 1.

The term "glaze state" in relation to the "coating formulation" can refer to the state of the coating formulation from operation 118 to operation 132.

The term "glass state" in relation to the "coating formulation" can refer to the state of the coating formulation from operation 132 to operation 140.

The term "texturizing agent" can refer to a component that is bound to the food product by the coating formulation.

The term "topical component" can refer to a product applied to the surface of coating formulation and/or texturizing agent after formation of the glass state.

The term "base product formulation" as used herein refers to the combination of the coating formulation, food product, texturizing agent, and non-stick agent.

The term "finished food product formulation" as used herein refers to the combination of the base product formulation, any topical component, and any oil component.

II. INGREDIENTS OF COATING FORMULATION

The coating formulation includes several ingredients. These ingredients can have a synergistic effect on the formulation as a whole. For example, the coating formulation can have a low-sweetness perception while also maintaining a viscosity that allows industrial processing. The coating formulation can also form a glass state to bind particulates and help provide a crunchy texture for a savory product.

1. Maltodextrin

The coating formulation can include a maltodextrin. In general, the maltodextrin can be a glass forming agent in the formulation while having a low-dextrose equivalent. Yet, the maltodextrin can attain a high solids count while maintaining a low viscosity, thereby helping to facilitate industrial flow of the formulation and coatability during application to a food product.

In one aspect, the maltodextrin can have a viscosity profile. At a temperature of about 200° F., the maltodextrin can have a viscosity in centipoises of about 2, 4, 6, 8, 10, 12, 14, 16, 18, 20 to about 2, 4, 6, 8, 10, 12, 14, 16, 18, and 20. At a temperature of about 250° F., the maltodextrin can have a viscosity in centipoises of about 20000, 22000, 24000, 26000, 28000, 30000 to about 20000, 22000, 24000, 26000, 28000, and 30000. At a temperature of about 275° F., the maltodextrin can have a viscosity in centipoises of about 75000, 80000, 85000, 90000, 95000, 100000, 105000, 110000, 115000, 120000, 125000 to about 75000, 80000, 85000, 90000, 95000, 100000, 105000, 110000, 115000, 120000, and 125000. In another aspect, at a temperature of about 275° F., the maltodextrin can have a viscosity in centipoises that is less than about 115000. At a temperature of about 300° F., the maltodextrin can have a viscosity in centipoises of about 125000, 130000, 135000, 140000, 145000, 150000, 155000, 160000, 165000, 170000, 175000 to about 125000, 130000, 135000, 140000, 145000, 150000, 155000, 160000, 165000, 170000, and 175000. In another aspect, at a temperature of about 300° F., the maltodextrin can have a viscosity in centipoises that is less than about 165000.

The maltodextrin can have a dextrose equivalent from about 0 to about 20. The dextrose equivalent can be from about 0, 1, 2, 3, 4, 5, 6, 7, 8, 9, 10, 11, 12, 13, 14, 15, 16, 17, 18, 19, 20 to about 0, 1, 2, 3, 4, 5, 6, 7, 8, 9, 10, 11, 12, 13, 14, 15, 16, 17, 18, 19, 20. In another aspect, the dextrose equivalent is less than about 20. The maltodextrin can have a glass transition from about 135° F. to about 155° F. In other aspects, the glass transition can be from about 140° F. to about 150° F. The glass transition can be from about 135° F., 140° F., 145° F., 150° F., 155° F. to about 135° F., 140° F., 145° F., 150° F., 155° F. In another aspect, the glass transition temperature is less than about 155° F. In yet another aspect, the glass transition temperature is less than about 150° F.

2. Sugar Alcohol

The coating formulation can include noncariogenic carbohydrate sweeteners such as a sugar alcohol. Some sugar alcohols can include lactitol, hydrogenated starch hydrolysates, mannitol, glycerol, sorbitol, arabitol, erythritol, maltitol, and xylitol. In one aspect, the sugar alcohol includes isomalt. Isomalt has a dextrose equivalent of about 0 and functions in a manner similar to sucrose in the formulation by helping to reduce the viscosity of the overall formulation. Yet, isomalt has a sweetness impact that is substantially less than sucrose. Accordingly, in some situations, isomalt can help reduce the viscosity of the coating to manage processing of the material while providing a low-sweetness to facilitate savory application of the formulation. In some situations, the absence of a sugar alcohol can cause that viscosity to become unmanageable during processing and the formation of glass can be mitigated during cooling.

3. Oil

The coating formulation can include one or more oils. The oil can include any glyceride with at least one fatty acid, and/or one or more liquid oils such as a liquid vegetable oil. The oil can include an antioxidant for preserving the oil. In one aspect, the oil is a liquid vegetable oil such a coconut oil, corn oil, cottonseed oil, olive oil, palm oil, peanut oil, rapeseed oil, canola oil, safflower oil, sesame oil, soybean oil, and/or sunflower oil. The oil is added to the formulation to help manage the flow characteristics of the formulation. For example, the oil can retard the speed at which the formulation enters the glass state. Accordingly, the flow characteristics of the glaze state of the formulation can be maintained to allow application to a food product before the glass state is formed. The oil can also be added to provide a softer candy texture and to mitigate tooth pack.

4. Saccharide

The coating formulation can include one or more saccharides. For example, the saccharide can include monosaccharide and/or disaccharide. For example, the monosaccharides and/or disaccharides can include fructose, galactose, xylose, ribose, lactose, maltose, and/or the like. In one example, a monosaccharide can include dextrose. When dextrose is utilized in the formulation, dextrose can function to help the formulation form a glass during the glass state and can decrease the viscosity of the formulation in the glaze state. When utilized, the percent weight in relation to the formula can be at a level to facilitate proper glass formation but not to a level of providing a significant sweetness impact to the formulation.

5. Sweet Inhibitor

The formulation can include one or more sweet inhibitors (maskers). For example, the sweet inhibitor can have a carboxylic acid salt such as lactisole as a component. As another example, the sweet inhibitor can include a gymnemic acid such a ziziphin and/or hodulcine. The sweet inhibitor functions to help mask sweetness perceptions from the other ingredients in the formulation. Accordingly, the sweet inhibitor can help further reduce any sweetness perception to facilitate savory applications of the formulation.

6. Lecithin

The formulation can include lecithin. The lecithin can be deflavored to mitigate any potential flavor component that the lecithin may contribute. The lecithin functions to help the emulsification of the water and oil as indicated and with continuing reference to FIG. 1.

7. Water

The formulation can include water. The water can be filtered and/or deionized water. As more fully indicated below, the water is emulsified with the oil to provide flowability of the formulation. As indicated in operational flow 100, as the formulation navigates the process, the water is cooked off to increase the solid concentration.

III. COATING PROCESSES AND FOOD PRODUCT

FIG. 1 indicates several exemplary operations associated with processing of a coating formulation. Even though FIG. 1 indicates a start operation and an end operation, the operations associated with FIG. 1 should not be read as being mutually exclusive or an ultimate start or ultimate end to the overall elements described herein. Also, FIG. 1 is utilized to describe components of the formulation of the coating, properties of the coating, and steps in the process for producing the coating. Operational flow 100 should not be read as requiring a dependency between the formulation, operational steps, and/or properties of the coating or food product.

FIG. 1 is an example operational flow diagram indicating example features associated with a coating formulation for a food product. Operational flow 100 begins at start operation 102 and continues to operation 104 where the oil and the lecithin can be combined. For example, the oil and lecithin can be combined in a vat, mixing vessel, and/or other type of industrial mixing process. In one aspect, the oil can be heated to a temperature from about 190° F. to about 220° F. The oil can be heated to about 190° F., 195° F., 200° F., 205° F., 210° F., 215° F., 220° F. to about190° F., 195° F., 200° F., 205° F., 210° F., 215° F., 220° F. After heating the oil, lecithin can be added and blended. The mixture can be blended for about 2 minutes to about 6 minutes. In other aspects, the oil and lecithin can be a premade mixture. In one aspect, the oil can be from about 10.0% to about 14.0% by total weight of the formulation in the hydrated state. In other aspects, the oil can be from about 5.0% to about 20.0% by total weight of the formulation in the hydrated state. The oil can be from about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0% to about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0% by total weight of the formulation in the hydrated state.

With regard to the lecithin, the lecithin can be from about 0.25% to about 0.35% by total weight of the formulation in the hydrated state. In other aspects, the lecithin can be from about 0.10% to about 1.00% by total weight of the formulation in the hydrated state. The lecithin can be from about 0.10%, 0.20%, 0.30%, 0.40%, 0.50%, 0.60%, 0.70%, 0.80%, 0.90%, 1.00% to about 0.10%, 0.20%, 0.30%, 0.40%, 0.50%, 0.60%, 0.70%, 0.80%, 0.90%, 1.00% by total weight of the formulation in the hydrated state.

From operation 104, operational flow 100 continues to emulsification operation 106. During emulsification operation 106, the oil and lecithin mixture of operation 104 can be emulsified with water. In one aspect, the water can be from about 30.0% to about 35.0% by total weight of the formulation of the hydrated state. The water can be from about 25.0% to about 45.0% by total weight of the formulation in the hydrated state. The water can be from about 25.0%, 26.0%, 27.0%, 28.0%, 29.0%, 30.0%, 31.0%, 32.0%, 33.0%, 34.0%, 35.0%, 36.0%, 37.0%, 38.0%, 39.0%, 40.0%, 41.0%, 42.0%, 43.0%, 44.0%, 45.0% to about 25.0%, 26.0%, 27.0%, 28.0%, 29.0%, 30.0%, 31.0%, 32.0%, 33.0%, 34.0%, 35.0%, 36.0%, 37.0%, 38.0%, 39.0%, 40.0%, 41.0%, 42.0%, 43.0%, 44.0%, 45.0% by total weight of the formulation in the hydrated state.

Operational flow 100 continues from emulsification operation 106 to operation 108 where the dry ingredients are added to oil and water emulsion formed during operation 106. During operation 108, the maltodextrine can be added to the emulsion. In one aspect, the maltodextrine can be from about 25.0% to about 35.0% by total weight of the formulation in the hydrated state. In another aspect, the maltodextrine can be from about 20.0% to about 40.0% by total weight of the formulation in the hydrated state. The maltodextrine can be from about 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0% to about 20.0%, 20.5%, 21.0%, 21.5%, 22.0%, 22.5%, 23.0%, 23.5%, 24.0%, 24.5%, 25.0%, 25.5%, 26.0%, 26.5%, 27.0%, 27.5%, 28.0%, 28.5%, 29.0%, 29.5%, 30.0%, 30.5%, 31.0%, 31.5%, 32.0%, 32.5%, 33.0%, 33.5%, 34.0%, 34.5%, 35.0%, 35.5%, 36.0%, 36.5%, 37.0%, 37.5%, 38.0%, 38.5%, 39.0%, 39.5%, 40.0% by total weight of the formulation in the hydrated state.

During operation 108, the sugar alcohol can be added to the oil and water emulsion formed during operation 106. In one aspect, the sugar alcohol can be from about 8.0% to about 12.0% by total weight of the formulation in the hydrated state. In another aspect, the sugar alcohol can be from about 5.0% to about 25% by total weight of the formulation in the hydrated state. The sugar alcohol can be from about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0% to about 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, 25.0% by total weight of the formulation in the hydrated state.

During operation 108, the saccharide can be added to the oil and water emulsion formed during operation 106. In one aspect the saccharide can be from about 10.0% to about 13.0% by total weight of the formulation in the hydrated state. The saccharide can be from about 2.0% to about 15.0% by total weight of the formulation in the hydrated state. The saccharide can be from about 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5, 11.0, 11.5, 12.0, 12.5, 13.0, 13.5, 14.0, 14.5, 15.0 to about 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%%, 10.5, 11.0, 11.5, 12.0, 12.5, 13.0, 13.5, 14.0, 14.5, 15.0 by total weight of the formulation in the hydrated state.

During operation 108, the sweet inhibitor can be added to the oil and water emulsion formed during operation 106. In one aspect, the sweet inhibitor can be from about 1.0% to about 3.0% by total weight of the formulation in the hydrated state. In another aspect, the sweet inhibitor can be from about 0.1% to about 5.0% by total weight of the formulation in the hydrated state. The sweet inhibitor can be from about 0.1%, 0.5%, 1.0%, 1.5%, 2.0%, 2.5%, 3.0%, 3.5%, 4.0%, 4.5%, 5.0% to about 0.1%, 0.5%, 1.0%, 1.5%, 2.0%, 2.5%, 3.0%, 3.5%, 4.0%, 4.5%, 5.0% by total weight of the formulation in the hydrated state. The concentration of the active ingredient of the sweetness inhibitor can be between 1 and 150 parts per million.

Operation 110 is indicated by a dashed line that encompasses operations 104-108. Operation 110 represents a mixing environment for the emulsion and the dry ingredients. As an example, operations 104-108 can occur at a temperature from about 180° F. to about 200° F. As another example, operations 104-108 can occur at a temperature from about 70° F. to about 200° F. The mixing temperature can be from about 70° F., 75° F., 80° F., 85° F., 90° F., 95° F., 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F. to about 70° F., 75° F., 80° F., 85° F., 90° F., 95° F., 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F.

In one aspect, the hydrated state of the formulation can have a solids content from about 50% to about 70%. The solids content of the hydrated state of the formulation can be from about 50%, 51%, 52%, 53%, 54%, 55%, 56%, 57%, 58%, 59%, 60%, 61%, 62%, 63%, 64%, 65%, 66%, 67%, 68%, 69%, 70% to about 50%, 51%, 52%, 53%, 54%, 55%, 56%, 57%, 58%, 59%, 60%, 61%, 62%, 63%, 64%, 65%, 66%, 67%, 68%, 69%, 70%.

From operation 108, operational flow 100 continues to operation 112 where the formulation is cooked to increase the solid content of the mixture. The formula can be cooked at a temperature from about 190° F. to about 212° F. until the formula reaches a solids content from about 70% to about 80%. The cooking temperature can be from about 190° F., 191° F., 192° F., 193° F., 194° F., 195° F., 196° F., 197° F., 198° F., 199° F., 200° F., 201° F., 202° F., 203° F., 204° F., 205° F., 206° F., 207° F., 208° F., 209° F., 210° F., 212° F. to about 190° F., 191° F., 192° F., 193° F., 194° F., 195° F., 196° F., 197° F., 198° F., 199° F., 200° F., 201° F., 202° F., 203° F., 204° F., 205° F., 206° F., 207° F., 208° F., 209° F., 210° F., 212° F. The solid content of the formulation can be from about 70%, 71%, 72%, 73%, 74%, 75%, 76%, 77%, 78%, 79%, 80% to about 70%, 71%, 72%, 73%, 74%, 75%, 76%, 77%, 78%, 79%, 80%.

Operational flow 100 continues to decision operation 114 where it is determined whether to hold the formulation for later processing. For example, an operator can determine to hold the formulation until downstream processing is initiated. In such a situation, decision operation 114 continues to storage operation 116 where the formulation is stored. In one aspect, the formulation can be stored to maintain the about 70% to about 80% solid content. Once downstream processing is initiated, operational flow 100 can continue from operation 116 to operation 118. In another aspect, operational flow 100 can continue directly from cook operation 112 to operation 118 without holding the formula.

Operational flow 100 continues to operation 118 where the formulation enters an evaporator to flash-off water in the formulation. The evaporator can flash-off the water at a temperature from about 270° F. to about 310° F. For example, the evaporator can flash-off the water at a temperature from about 270° F., 272° F., 274° F., 276° F., 278°

F., 280° F., 282° F., 284° F., 286° F., 288° F., 290° F., 292° F., 294° F., 296° F., 298° F., 300° F., 302° F., 304° F., 306° F., 308° F., 310° F. to about 270° F., 272° F., 274° F., 276° F., 278° F., 280° F., 282° F., 284° F., 286° F., 288° F., 290° F., 292° F., 294° F., 296° F., 298° F., 300° F., 302° F., 304° F., 306° F., 308° F., 310° F.

After the water is evaporated, the formulation transitions to its glaze state. The glaze state can be flowable in a typical industrial plant setting having fluid transport conduits for applying coatings to food products. In its glaze state, the formulation can have a viscosity profile. For example, at a temperature of about 200° F. the viscosity can be from about 1 to about 20 centipoises. At a temperature of about 200° F. the viscosity can be from about 1, 2, 4, 6, 8, 10, 12, 14, 16, 18, 20 to about 1, 2, 4, 6, 8, 10, 12, 14, 16, 18, 20. As another example, at a temperature of about 250° F. the viscosity can be from about 150 to about 250 centipoises. At a temperature of about 250° F. the viscosity can be from about 150, 155, 160, 165, 170, 180, 185, 190, 195, 200, 205, 210, 215, 220, 225, 230, 235, 240, 245, 250 to about 150, 155, 160, 165, 170, 180, 185, 190, 195, 200, 205, 210, 215, 220, 225, 230, 235, 240, 245, 250. As another example, at a temperature of about 275° F. the viscosity can be from about 400 to about 700 centipoises. At a temperature of about 275° F. the viscosity can be from about 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700 to about 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700 centipoises. As another example, at a temperature of about 300° F. the viscosity can be from about 1000 to about 3000 centipoises. At a temperature of about 300° F. the viscosity can be from about 1000, 1100, 1200, 1300, 1400, 1500, 1600, 1700, 1800, 1900, 2000, 2100, 2200, 2300, 2400, 2500, 2600, 2700, 2800, 2900, 3000 to about 1000, 1100, 1200, 1300, 1400, 1500, 1600, 1700, 1800, 1900, 2000, 2100, 2200, 2300, 2400, 2500, 2600, 2700, 2800, 2900, 3000. As yet another example, at a temperature of less than about 325° F. the viscosity can be less than about 50,000 centipoises. At a temperature of less than about 325° F. the viscosity can be less than about 50000, 45000, 40000, 35000, 30000, 29000, 28000, 27000, 26000, 25000, 24000, 23000, 22000, 21000, 20000, 19500, 19000, 185000, 18000, 17500, 17000, 16500, 16000, 15500, 15000, 14500, 14000, 13500, 13000, 12500, 12000, 11500, 11000, 10500, 10000, 9500, 9000, 8500, 8000, 7500, 7000, 6500, 6000, 5500, 5000, 4900, 4800, 4700, 4600, 4500, 4400, 4300, 4200, 4100, 4000, 3900, 3800, 3700, 3600, 3500, 3400, 3300, 3200, 3100, 3000, 2900, 2800, 2600, 2500, 2400, 2300, 2200, 2100, 2000, 1900, 1800, 1700, 1600, and 1500 centipoises.

The solid content of the formulation in the glaze state can be from about 95.0% to about 99.0%. For example, the solid content of the formulation can be from about 95.0%, 95.5%, 96.0%, 96.5%, 97.0%, 97.5%, 98.0%, 98.5%, 99.0% to about 95.0%, 95.5%, 96.0%, 96.5%, 97.0%, 97.5%, 98.0%, 98.5%, 99.0%.

The formulation in the glaze state can have a glass transition temperature from about 145° F. to about 155° F. The formulation can have a glass transition temperature from about 145° F., 146° F., 147° F., 148° F., 149° F., 150° F., 151° F., 152° F., 153° F., 154° F., 155° F. to about 145° F., 146° F., 147° F., 148° F., 149° F., 150° F., 151° F., 152° F., 153° F., 154° F., 155° F.

The glaze state of the formulation can have a dextrose equivalent. The dextrose equivalent can be from about 10 to about 30. The dextrose equivalent can be from about 10, 12, 14, 16, 18, 20, 22, 24, 26, 28, and 30 to about 10, 12, 14, 16, 18, 20, 22, 24, 26, 28, and 30. In other aspects, the dextrose equivalent can be less than about 30, 28, 26, 24, 22, 20, 18, 16, 14, 12, and 10. The dextrose equivalent can be a calculation based dextrose equivalent from about 10 to about 20. The calculation based dextrose equivalent can be from about 10, 11, 12, 13, 14, 15, 16, 17, 18, 19, and 20 to about 10, 11, 12, 13, 14, 15, 16, 17, 18, 19, and 20. The dextrose equivalent can also have a test based dextrose equivalent from about 10 to about 30. The test based dextrose equivalent can be from about 10, 12, 14, 16, 18, 20, 22, 24, 26, 28, and 30 to about 10, 12, 14, 16, 18, 20, 22, 24, 26, 28, and 30. In one example, a portion of the difference between the calculation based dextrose equivalent and the test based dextrose equivalent can be due to hydrolysis of the maltodextrin into less polymerized dextrins under processing conditions.

Given the removal of the water during evaporation, each of the ingredients has a different percent weight of the total formula in relation to the hydrated state. For example, in the glaze state, the maltodextrine can be from about 40.0% to about 47.0% by total weight of the formulation in the glaze state. In another aspect, the maltodextrine can be from about 35.0% to about 50.0% by total weight of the formulation in the glaze state. The maltodextrine can be from about 35.0%, 36.0%, 37.0%, 38.0%, 39.0%, 40.0%, 41.0%, 42.0%, 43.0%, 44.0%, 45.0%, 46.0%, 47.0%, 48.0%, 49.0%, 50.0% to about 35.0%, 36.0%, 37.0%, 38.0%, 39.0%, 40.0%, 41.0%, 42.0%, 43.0%, 44.0%, 45.0%, 46.0%, 47.0%, 48.0%, 49.0%, 50.0% by total weight of the formulation in the glaze state.

In the glaze state, the sugar alcohol can be from about 12.0% to about 16.0% by total weight of the formulation. In another aspect, the sugar alcohol can be from about 10% to about 30% by total weight of the formulation in the glaze state. The sugar alcohol can be from about 10.0%, 11.0%, 12.0%, 13.0%, 14.0%, 15.0%, 16.0%, 17.0%, 18.0%, 19.0%, 20.0%, 21.0%, 22.0%, 23.0%, 24.0%, 25.0%, 26.0%, 27.0%, 28.0%, 29.0%, 30.0% to about 10.0%, 11.0%, 12.0%, 13.0%, 14.0%, 15.0%, 16.0%, 17.0%, 18.0%, 19.0%, 20.0%, 21.0%, 22.0%, 23.0%, 24.0%, 25.0%, 26.0%, 27.0%, 28.0%, 29.0%, 30.0% by total weight of the formulation in the glaze state.

In the glaze state, the oil can be from about 16.0% to about 21.0% by total weight of the formulation. In another aspect, the oil can be from about 15.0% to about 25.0% by total weight of the formulation in the glaze state. The oil can be from about 15.0%, 16.0%, 17.0%, 18.0%, 19.0%, 20.0%, 21.0%, 22.0%, 23.0%, 24.0%, 25.0% to about 15.0%, 16.0%, 17.0%, 18.0%, 19.0%, 20.0%, 21.0%, 22.0%, 23.0%, 24.0%, 25.0% by total weight of the formulation in the glaze state.

In the glaze state, the saccharide can be from about 15.0% to about 18.0% by total weight of the formulation. In other aspects the saccharide can be from about 5.0% to about 20.0% The saccharide can be from about 5.0%, 6.0%, 7.0%, 8.0%, 9.0%, 10.0%, 11.0%, 12.0%, 13.0%, 14.0%, 15.0%, 16.0%, 17.0%, 18.0%, 19.0%, 20.0% to about 5.0%, 6.0%, 7.0%, 8.0%, 9.0%, 10.0%, 11.0%, 12.0%, 13.0%, 14.0%, 15.0%%, 16.0%, 17.0%, 18.0%, 19.0%, 20.0% by total weight of the formulation in the glaze state.

In the glaze state, the sweet inhibitor can be from about 2.0% to about 3.5% by total weight of the formulation. In another aspect, the sweet inhibitor can be from about 0.1% to about 5.0% by total weight of the formulation in the glaze state. The sweet inhibitor can be from about 0.1%, 0.5%, 1.0%, 1.5%, 2.0%, 2.5%, 3.0%, 3.5%, 4.0%, 4.5%, 5.0% to about 0.1%, 0.5%, 1.0%, 1.5%, 2.0%, 2.5%, 3.0%, 3.5%, 4.0%, 4.5%, 5.0% by total weight of the formulation in the glaze state.

In the glaze state, the lecithin can be from about 0.35% to about 0.60% by total weight of the formulation in the hydrated state. In other aspects, the lecithin can be from about 0.10% to about 1.00% by total weight of the formulation in the hydrated state. The lecithin can be from about 0.10%, 0.20%, 0.30%, 0.40%, 0.50%, 0.60%, 0.70%, 0.80%, 0.90%, 1.00% to about 0.10%, 0.20%, 0.30%, 0.40%, 0.50%, 0.60%, 0.70%, 0.80%, 0.90%, 1.00% by total weight of the formulation in the hydrated state.

In the glaze state, the water can be from about 1.0% to about 5.0% by total weight of the formulation. The water can be from about 1.0%, 1.5%, 2.0%, 2.5%, 3.0%, 3.5%, 4.0%, 4.5%, 5.0% to about 1.0%, 1.5%, 2.0%, 2.5%, 3.0%, 3.5%, 4.0%, 4.5%, 5.0% by total weight of the formulation in the glaze state.

Returning to FIG. 1, operational flow 100 continues from operation 118 to operation 122 where a food is coated. The food can be a food for forming a snack food, a low moisture food product, a shelf stable food product, a carbohydrate based food product and combinations thereof. As an example, the food can include an individual food, an aggregated food, and/or a formed food. As an example, the individual food can include popped popcorn, puffed snacks, extruded puffed snacks, cracker type snacks, pretzel type snacks, chip type snacks, and/or the like. In other aspects, an individual food can include partial or whole grains, seeds, and cereal. An aggregated food can include an aggregate of more than one individual food. For example, an aggregated food can include a popcorn ball. Formed foods can include snack bars, nutrition bars, health bars, and the like.

In one aspect, a food is conveyed through a mixer and the glaze state of the formulation is mixed with the food. For example, the glaze state can be applied to the mixture when an individual food or aggregated food is being coated. In other aspects, the glaze state can be cascaded, dripped, and/or poured. In still other aspects, the food product can be dipped into the glaze state of the formulation. As an example, the glaze state could be poured, dripped, or cascaded on a formed food product such as a bar. In the situation where a mixer is used, the mixer can be a heated screw-type conveyance mixer. The mixer can be heated to maintain the formulation at a temperature from about 270° F. to about 310° F. The mixer can be heated to maintain the formulation at a temperature from about 270° F., 275° F., 280° F., 285° F., 290° F., 295° F., 300° F., 305° F., 310° F. to about 270° F., 275° F., 280° F., 285° F., 290° F., 295° F., 300° F., 305° F., 310° F. At these temperatures, the formulation can have a viscosity profile as indicated above.

From operation 122, operational flow 100 can continue to decision operation 126. At decision operation 126, it is decided whether conglomeration is occurring within the mixer (in the situation where a mixer is utilized). For example, as the mixer conveyor transports the food and glaze state of the formulation, the mixture can clump as the glaze state of the formulation cools. In such a situation, operational flow 100 can continue from decision operation 126 to operation 124 where a non-stick ingredient is added. For example, lecithin can be added to the mixer conveyor to facilitate mixing and transport of the mixture. The non-stick ingredient can be added directly into the mixer conveyor via a sprayer, dripper, and/or the like. The decision to add the non-stick ingredient can be time based, in response to an operator determination, and/or in response to a signal from a sensor. From operation 124, operational flow 100 continues to decision operation 128. Likewise, in the situation where conglomeration is not occurring, operational flow 100 also continues to decision operation 128.

At decision operation 128, it is decided whether to add a texturizing agent. The texturizing agent can include any type of friable ingredient capable of being applied in small particulate form. For example, a small particulate form can include particulates that are less than about 5 mm in diameter. Such a decision can be made by an operator in order to add a particular mouth feel to the end food product. For example, a texturizing agent that facilitates a crunchy product could be added. The texturizing agent can also include one or more organoleptic properties such as those identified in operation 136 in association with the topical component. In one aspect, the texturizing agent is a starch based component such as corn flakes, potato flakes, partial or whole grains, partial or whole seeds, partial or whole nuts, and/or the like. In one aspect, the texturizing agent can be added to the mixer conveyor downstream of the addition of the food and the glaze state of the formulation. As such, the glaze state of the formulation can adhere to the food. The texturizing agent can then be adhered to the surface of the glaze state of the formulation just prior to the formulation cooling and forming its glass state. In the situation where the texturizing agent is desired, operational flow 100 continues from decision operation 128 to operation 130 where the texturizing agent is applied as indicated above. Operational flow 100 then continues to cooling operation 132. Likewise, in the situation where a texturizing agent is not desired, operational flow 100 also continues to cooling operation 132.

Operation 120 is indicated by a dashed line that encompasses operations 122-130. Operation 120 represents the application of the glaze state to the food. The application environment associated with operation 120 includes heating the mixing conveyor to about 280° F. to about 300° F. to maintain the mixture in the mixing conveyor at a temperature from about 270° F. to 310° F. For example, the mixing conveyor can be heated to a temperature from about 280° F., 285° F., 290° F., 295° F., 300° F. to about 280° F., 285° F., 290° F., 295° F., 300° F. The mixture can be maintained at a temperature from about 270° F., 275° F., 280° F., 285° F., 290° F., 295° F., 300° F., 305° F., 310° F. to about 270° F., 275° F., 280° F., 285° F., 290° F., 295° F., 300° F., 305° F., 310° F.

The mixture can have a base product formulation after leaving the mixing environment associated with operation 120. As one example, the mixture may include popped popcorn kernels as the food. The popped popcorn kernels can include about 15% to about 40% by total weight of the base product formulation. In another example, the popped popcorn can include about 25% to about 30% by total weight of the base product formulation. The popped popcorn kernels can include about 25%, 26%, 27%, 28%, 29%, 30% to about 18%, 19%, 20%, 21%, 22%, 23%, 24%, 25%, 26%, 27%, 28%, 29%, 30% by total weight of the base product formulation.

As indicated above, the base product formulation can include the glaze state of the coating formulation. The coating formulation can include about 40% to about 80% by total weight of the base product formulation. The coating formulation can include about 40%, 42%, 44%, 46%, 48%, 50%, 52%, 54%, 56%, 58%, 60%, 62%, 64%, 66%, 68%, 70%, 72%, 74%, 76%, 78%, 80% to about 40%, 42%, 44%, 46%, 48%, 50%, 52%, 54%, 56%, 58%, 60%, 62%, 64%, 66%, 68%, 70%, 72%, 74%, 76%, 78%, 80% by total weight of the base product formulation.

The base product formulation can also optionally include a texturizing agent. In the situation where a texturizing agent is utilized, the texturizing agent can be about 10% to about 25% by total weight of the base product formulation. In other aspects, the texturizing agent can be about 1% to about 40% by total weight of the base product formulation. The texturizing agent can be about 1%, 5%, 10%, 15%, 20%, 25%, 30%, 35%, 40% to about 1%, 5%, 10%, 15%, 20%, 25%, 30%, 35%, 40% by total weight of the base product formulation.

The base product formulation can also include an optional non-stick agent. In the situation where a non-stick agent is utilized, the non-stick agent can be about 1.0% to about 6.0% by total weight of the base product formulation. The non-stick agent can be about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.5%, 4.0%, 4.5%, 5.0%, 5.5%, 6.0% to about 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.5%, 4.0%, 4.5%, 5.0%, 5.5%, 6.0% by total weight of the base product formulation.

Returning to FIG. 1, operational flow 100 continues from the mixing to cooling operation 132. At operation 132, the base product formulation is cooled to allow the glaze state of the coating formulation to transition to the glass state of the coating formulation. In one aspect, the cooling can occur in association with a conveyance system that transports the base product formulation through a series of coolers.

Operational flow 100 continues from cooling operation 132 to decision operation 134 where it is decided whether to apply a topical component to the base product formulation. When it is decided to not apply a topical component to the base product formulation, the base product formulation continues to operation 138 as indicated in FIG. 1. When it is decided to apply a topical component to the base product formulation, operational flow 100 continues to operation 136 where the topical component is applied. The topical component can be a liquid topical component. In other situations, the topical component is a dry topical component. In one aspect, an oil component can be initially applied to the surface of the base product formulation to facilitate the adherence of a dry topical component to the base product formulation. In other situations the topical component includes the oil.

The topical component can include a flavor component, a texture component, a nutrient component, a color component, an aromatic component, and mixtures thereof. As an example, the topical component can include a cheese flavor component to impart a cheese flavor impact when the food product is consumed. As another example, the topical component can include a cheese flavor component and an orange color component to impart the combination of a cheese flavor impact and an orange color impact. As yet another example, the topical component can include the combination of a cheese flavor component, an orange color component, a calcium nutrient component, and/or a cheese aromatic component. There are a myriad of combinations and sub-combinations of topical components that can be applied to the food product. Although sweet topical components are within the scope of applications, given the low-dextrose equivalent of the coating formulation, savory type topical components can be accentuated.

As indicated above, the topical component can include a flavor component. By use of the term "flavor component", what is intended is a flavor additive or multiple flavor additives that modify and/or enhance the flavor of the food compared to if the flavor component was not present. That is, the flavor component adds and/or enhances an effective amount of flavor that is discernible to the consumer of the food product. Examples of natural and artificial flavor components include, but are not limited to: butter, sugar, sweet (such as chocolate, chocolate mint, mint, chocolate banana, honey, vanilla, pineapple, coconut, peppermint), cheese (such as cheddar cheese, mild cheddar, white cheddar, blue cheese, mozzarella, parmesan), pizza, salsa, barbeque, smoke, hickory, applewood or mesquite, dry roast, buffalo wing, fruit flavors (such as apple, cherry, berry, orange, banana, pineapple), vegetable flavors (such as tomato, onion, jalapeno, habaneros), pickle, spices (such as garlic, onion, chives, parsley, general herb, mustard, pepper, cinnamon), sour cream, sweet cream, honey mustard, hot mustard, and vinegar. Flavor components that provide sour flavors or spicy or hot flavors can also be used. A wide variety of other flavors or flavor enhancers can be used and would be included as a flavor component. For example, peanut flavors, yeast extracts, or similar materials are useable.

Any of these stated flavor components can be used as a solid material (such as a dry powder or a bead) and/or a liquid material (such as an oil or a solution). Some examples of solid or dry flavor components can incorporate the flavors in a protein shell, protecting sensitive components from loss or degradation during processing (such as heating), or interaction with other food ingredients (such as oil). Release of the full flavor profile can be delivered by the shearing action of chewing.

As indicated above, the topical component can include a color component. By use of the term "color component", what is intended is a color additive or multiple color additives that modify and/or enhance the natural color of the food product as compared to if the color component was not added. That is, the color component adds and or enhances an effective amount of color that is discernible to the consumer of the product. For example, when a yellow hue is desired, a yellow dye can be added to the topical component. Yet, various color agents can be included in the topical component component for coloring the food product for a variety of purposes. For example, on St. Patrick's Day, a green coloring can be used. Also, the color component can accent a flavor component. For example, a topical component can have a Cajun flavor component and can be accented with a red hued color component.

As indicated above, the topical component can include a nutrient component. By use of the term "nutrient component", what is intended is a nutrient additive or multiple nutrient additives for facilitating a discernible or indiscernible health effect. Such nutrient components can include fatty acids such as omega-3 fatty acids, omega-6 fatty acids, saturated fatty acids, and monounsaturated fatty acids. Other nutrient components can include amino acids such as Isoleucine, Leucine, Lysine, Methionine, Phenylalanine, Threonine, Tryptophan, Valine, Histidine, Tyrosine, and Selenocysteine. Other amino acids can include Alanine, Arginine, Aspartate, Cysteine, Glutamate, Glutamine, Glycine, Proline, Serine, Asparagine, and Pyrrolysine. Other nutrient components can include vitamins such as retinol, choline, thiamin, riboflavin, vitamin G, niacin, vitamin P, vitamin PP, adenine, epileptic biotin, pantothenic acid, pyridoxine, pyridoxamine, pyridoxal, biotin, vitamin H, folic acid, folate, vitamin M, cobalamin, ascorbic acid, ergocalciferol, cholecalciferol, tocopherol, and naphthoquinoids. Yet another "nutrient component" can include dietary minerals such as calcium, chloride, chromium, cobalt, copper, iodine, iron, magnesium, manganese, molybdenum, nickel, phosphorus, potassium, selenium sodium sulfur, and zinc.

As indicated above, the topical component can include an aromatic component. By use of the term "aromatic component", what is intended is an aromatic additive or multiple aromatic additives that modify and/or enhance the natural aroma of the food product compared to if the aromatic component was not added. That is, the aromatic component adds an effective amount of aroma that is discernible to the consumer of the product. An aromatic component can allow for a controlled release of a desired aroma from the food product. In one aspect, the aromatic component can be configured to compliment a flavor component and/or color component. In some aspects, the aromatic component is configured to not taste. The aromatic component may be released by multiple mechanisms, including time, heat, and/or physical manipulation. Some example aromatic components, which are not meant to be limiting, can include Aldehyde C-16, Aldehyde C-18, Aldehyde C-19, Aldehyde C-20, Aldehyde C-8, Aldehyde C-9, Aldron, Allyl Amyl Glycolate, Alpha Amyl Cinnamic, Aldehyde, Alpha Damascon, Alpha Ionone, Cumarin, Cyclogalbanate, Cyclosrose, Dep (Di Etyl Phthalate), DHM (Di, Hydro Mercenol), Di Hydro Iso Jasmone, DMHQ (Dimethyl Hydro Quinone), DMO (Di Methyl Octonol), Ethyl Maltol, Ethyl Vanilline, Eucalyptol, Neroline Bromalia, Nopyl Acetate, Orange Oil P.E.M.E., Para Cresyl Acetate, Para Cresyl Phenyl Acetate, Patcholi, Petit Grain, Phenyl Acetic Acid, and Phenyl Ethyl Alcohol.

Prior to operational flow 100 continuing to package operation 138, the food product can have a finished food product formulation. In the situation where a topical component is added, the finished food product formulation can have a base product formulation from about 80% to about 90% by total weight of the finished food product formulation. In other aspects, the finished food product formulation can have a base product formulation from about 70% to about 95% by total weight of the finished food product formulation. The base product formulation can be from about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95% to about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95% by total weight of the finished food product formulation.

The finished food product formulation can have a topical component from about 10% to about 15% by total weight of the finished food product formulation. In other aspects, the finished food product formulation can have a topical component from about 1% to about 25% by total weight of the finished food product formulation. The topical component can be from about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25% to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25% by total weight of the finished food product formulation.

The finished food product formulation can have an oil component from about 2.5% to about 7.5% by total weight of the finished food product formulation. In other aspects, the finished food product formulation can have an oil component from about 0% to about 15% by total weight of the finished food product. The oil component can be from about 0%, 1.0%, 2.0%, 3.0%, 4.0%, 5.0%, 6.0%, 7.0%, 8.0%, 9.0%, 10.0%, 11.0%, 12.0%, 13.0%, 14.0%, 15.0% to about 0%, 1.0%, 2.0%, 3.0%, 4.0%, 5.0%, 6.0%, 7.0%, 8.0%, 9.0%, 10.0%, 11.0%, 12.0%, 13.0%, 14.0%, 15.0% by total weight of the finished food product formulation.

Returning to FIG. 1, operational flow 100 continues to package operation 138 where the finished product formulation is packaged. The finished product formulation can be packaged to have a modified atmosphere with reduced oxygen levels to increase the time before expiration. The package can contain about 5% oxygen. The package can contain about 0%, about 1%, about 2%, about 3%, about 4%, or about 5% oxygen. During packaging, a gas flush and/or oxygen scavenges can be utilized to reduce the oxygen level. In one aspect, the gas flush can include aromatics to provide a desirable aroma to the packaged product. The packaged product can be equilibrated prior to shipping. Operational flow 100 then ends at end operation 140.

VI. EXAMPLES

The coating formulation was tested for several properties as more fully indicated in the below examples. The coating formulation in its hydrated state had the following composition:

TABLE A

| Ingredient | Percentage of total formulation |
| --- | --- |
| Maltodextrin | 29.70% |
| Isomalt | 17.30% |
| Oil | 12.80% |
| Dextrose | 5.33% |
| Lactisol based ingredient | 1.33% |
| Lecithin | 0.26% |
| Water | 33.28% |
| TOTAL | 100.00% |

To prepare the coating formulation, the lecithin was added to oil and heated to about 150° F. The maltodextrin, isomalt, dextrose, and the lactisol based ingredient were mixed in a pot with the water until the ingredients dissolved. The oil and lecithin were then added to the pot and mixed with an immersion blender. The mixture was heated at about 280° F. until the coating formulation reached its glaze state. The coating formulation in its glaze state had the following composition:

TABLE B

| Ingredient | Percentage of total formulation |
| --- | --- |
| Maltodextrin | 43.72% |
| isomalt | 25.48% |
| Oil | 18.63% |
| dextrose | 7.83% |
| Lactisol based ingredient | 1.96% |
| Lecithin | 0.39% |
| Water | 1.99% |
| TOTAL | 100.00% |

1. Dextrose Equivalent and Degree of Polymerization of the Coating Formulation.

The dextrose equivalent ("DE") and degree of polymerization ("DP") of the coating formulation were determined via a theoretical model, via the Lane-Enyon titration method and via high performance anion-exchange chromatography with pulsed amperometric detection (HPAEC-PAD). The theoretical model for determining DE and DP is as follows:

$$DE = [\Sigma_0^n (\% \text{ ingredient}/100 \times DE\text{ingredient})] * [\% \text{ dry matter}/100] DP_{avg} = 100/DE$$

Under the Lane-Eynon constant titre method (AOAC 923.09), samples were prepared by weighing 5 grams of the formulation as indicated in TABLE B in 500 mL of deionized water. 25 ml of standardized Fehling's solution was titrated with the sample. The boiling endpoint was reached for the sample. Dextrose equivalent was determined from the volume of sample used in titration. The average degree of polymerization was calculated from DE based on the formula DPavg=100/DE.

The HPAEC-PAD method was used as an orthogonal conformational technique to obtain DPavg. 1000 ppm solutions were prepared by weighing 0.1 g of sample (TABLE B) into a 100 ml volumetric flask and diluting to volume with deionized water. Samples were filtered through 0.45 um syringe-tip filters prior to analysis. HPAEC-PAD was performed using a Dionex CS-3000 chromatograph equipped with a pulsed amperometric detector. The waveform used was as follows: E1=+50 mV (t1=200 ms, sampling period=200 ms), E2=+750 mV (t2=200 ms), E3=−150 mV (t3=400 ms). The column used was a Dionex CarboPac PA1 (250mm×4 mm I.D.). The mobile phase consisted of 100 mM sodium hydroxide (eluent A) and 100 mM sodium hydroxide containing 600 mM sodium acetate (eluent B). The gradient was a linear program: 20% eluent B at 0 min, 90% at 50 min. The flow-rate was 1 ml/min and the injection volume was 25 ul. Chromelean (Dionex) version 6.8 was used for data analysis. DPavg was determined chromatographically and the dextrose equivalent was calculated from DPavg base on the formula DE equals 100/DPavg. The results of each of the methods are indicated below in TABLE C.

TABLE C

| Formulation | Calculated | | Lane-Enyon | | HPAEC-PAD | |
| --- | --- | --- | --- | --- | --- | --- |
| | DE | DP (avg) | DE | DP (avg) | DE | DP (avg) |
| TABLE B | 14.2 | 7 | 19.4 | 5.2 | 18 | 5.6 |

2. Sensory Sweetness Observation of Coating Formulation

The purpose of the sensory sweetness observation test was to determine the sweetness of the coating formulation in relation to sucrose. To conduct the testing several samples were prepared. Two baseline samples were prepared. The first baseline sample was a 2% sucrose solution. The second baseline sample was a 5% sucrose solution. A test panel was then trained that the 2% sucrose solution equated to a value of "2" and that the 5% sucrose solution equated to a value of "5".

Three samples were prepared related to the coating formulation. The formulation (Table B) was diluted in water to form 5% and 10% solutions. Also, the formulation (Table B) was allowed to cool and form a hard candy (glass state). After training of the panel, each of the three samples related to the coating formulation were tested and given a value. The results of the testing are indicated below in TABLE D.

TABLE D

| Sample | Mean | Standard Deviation | MIN | MAX | p-value for difference from 2% Sucrose Solution | p-value for difference from 5% Sucrose Solution |
| --- | --- | --- | --- | --- | --- | --- |
| 5% Coating Formulation in Solution | 1.9 | 0.6 | 1 | 3 | 0.67 | <0.0001 |
| 10% Coating Formulation in Solution | 2.8 | 0.4 | 2.2 | 3.5 | <0.0001 | <0.0001 |
| Glass State of Coating Formulation | 3.1 | 0.6 | 2.3 | 4 | <0.0001 | <0.0001 |

As indicated above, average sweetness value of a 5% concentration of the coating formulation was about the same as a 2% concentration of sucrose. As also indicated above, a 10% concentration of the coating formulation was about half as sweet as a 5% concentration of sucrose. Furthermore, the undiluted glass state of the coating formulation is two value points lower than a 5% concentration of sucrose. The alpha value associated with the indicated P-Values in TABLE D is 0.05.

3. Glass Transition of Coating Formula

Figure 2:
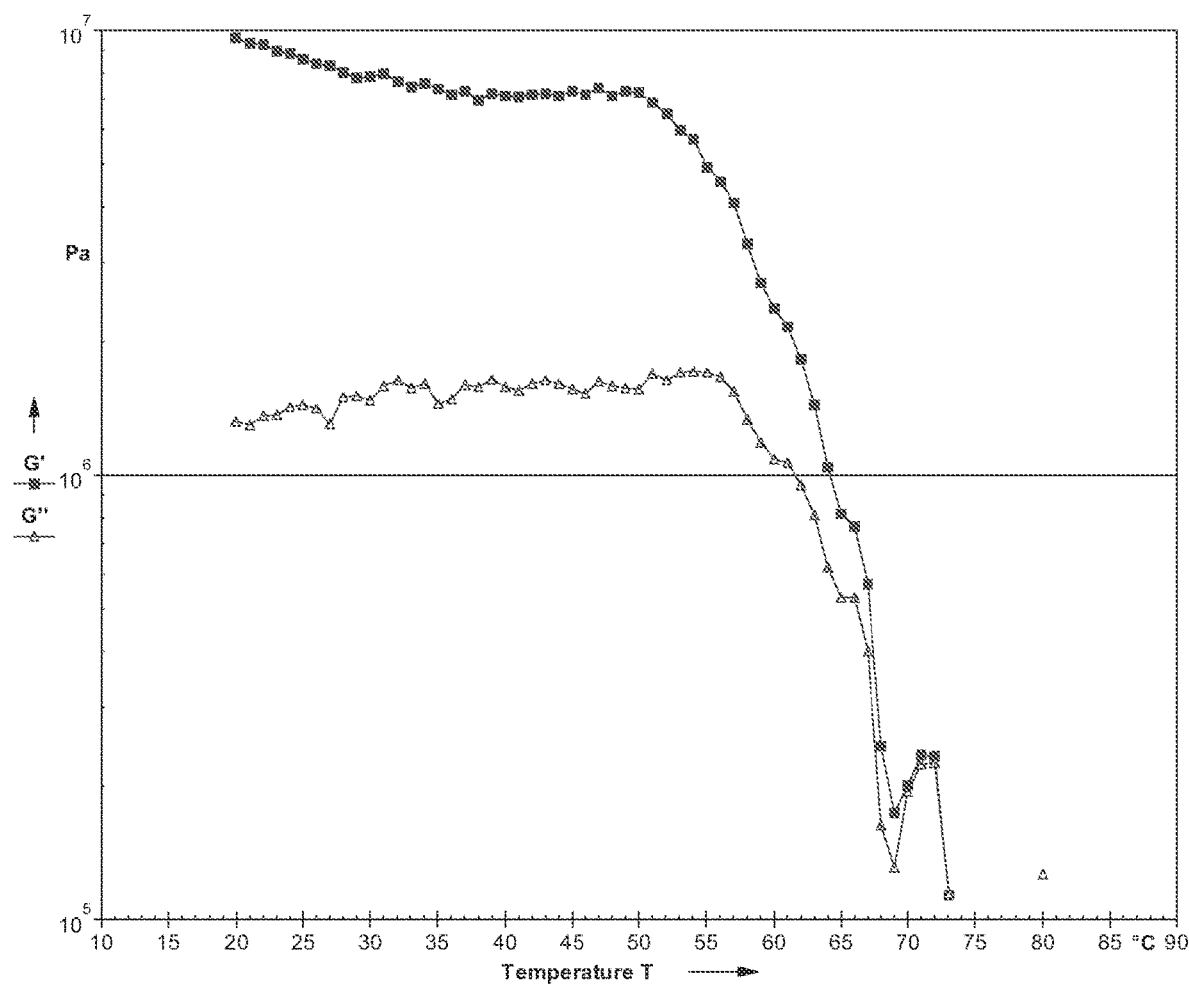
FIG. 2 is an example graph indicating an example glass transition temperature of the coating.

The glass transition ($T_g$) of the coating formulation (TABLE 2) is represented in FIG. 2. The upper curve G' represents the storage modulus which is the elastic or solid-like component of the sample's response. The lower curve G" represents the loss modulus which is the viscous or liquid-like component of the sample's response. The glass transition is the maximum value of G" and was determined to be 54° C. The instrument used to determine the glass transition temperature was an Anton Paar MCR301 research rheometer. The instrument was outfitted with a P-PTD200 temperature control plate and a PP50 parallel plate. To prepare the sample, the glass state of the formulation (TABLE B) was ground in a food processor to form a powder. Approximately 8 g of powder was placed in a single-use dish. The dish was placed on the rheometer, and the temperature was set to 145° C. The PP50 fixture was lowered on top of the sample, and the sample melted. The temperature was then lowered to 20° C., which froze the sample. The sample sat for 60 minutes at 20° C. Following the rest period, the instrument ran an oscillation test on the sample. Oscillation experiments generate two material functions: the storage and loss moduli as indicated above. The sample was tested by applying a strain of $5 \times 10^{-5}$ at a frequency of 1 Hz from 20° to 80° C. at 1° C./min.

4. Textural Analysis of Coating Formula on Popped Popcorn Product

Figure 3:
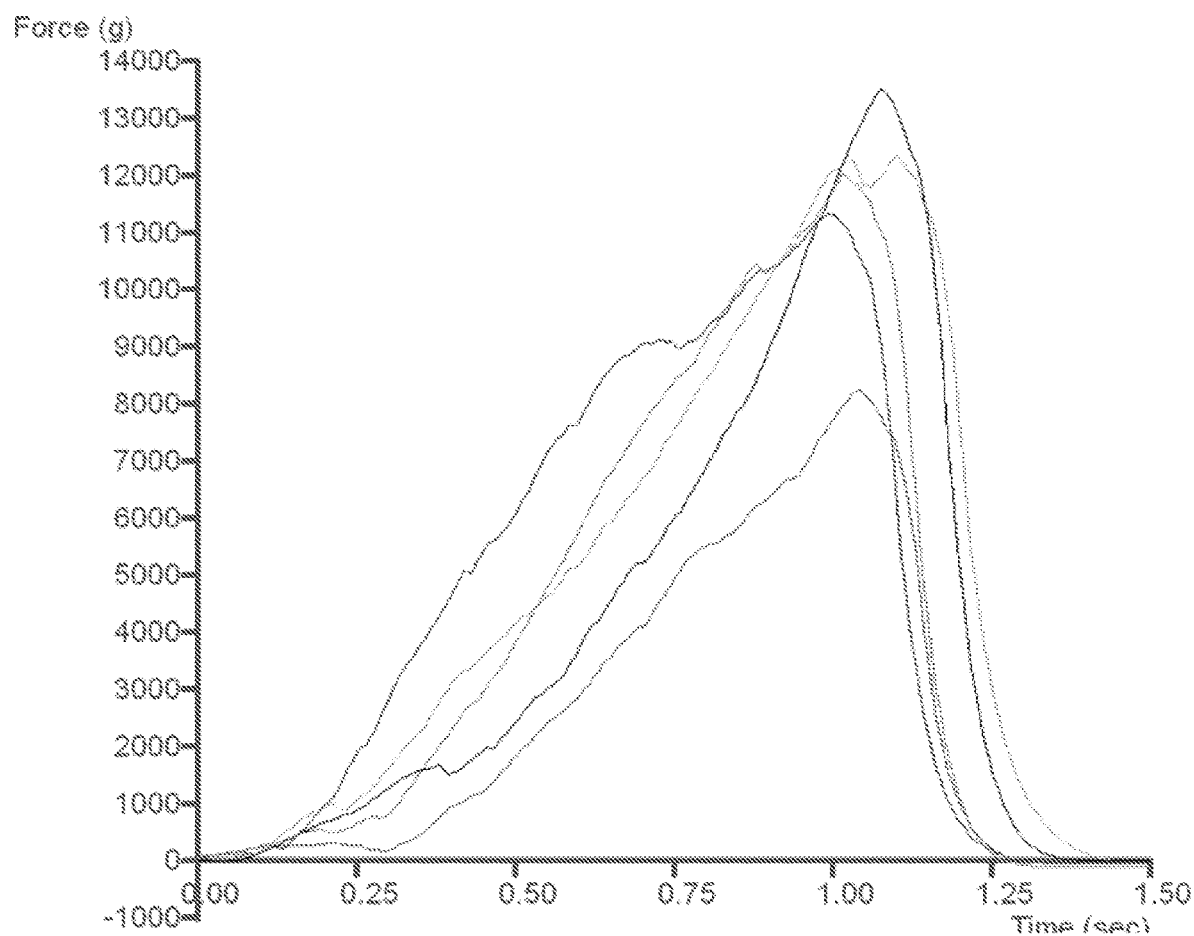
FIG. 3 is an example graph indicating example textural characteristics of popped popcorn.
Figure 4:
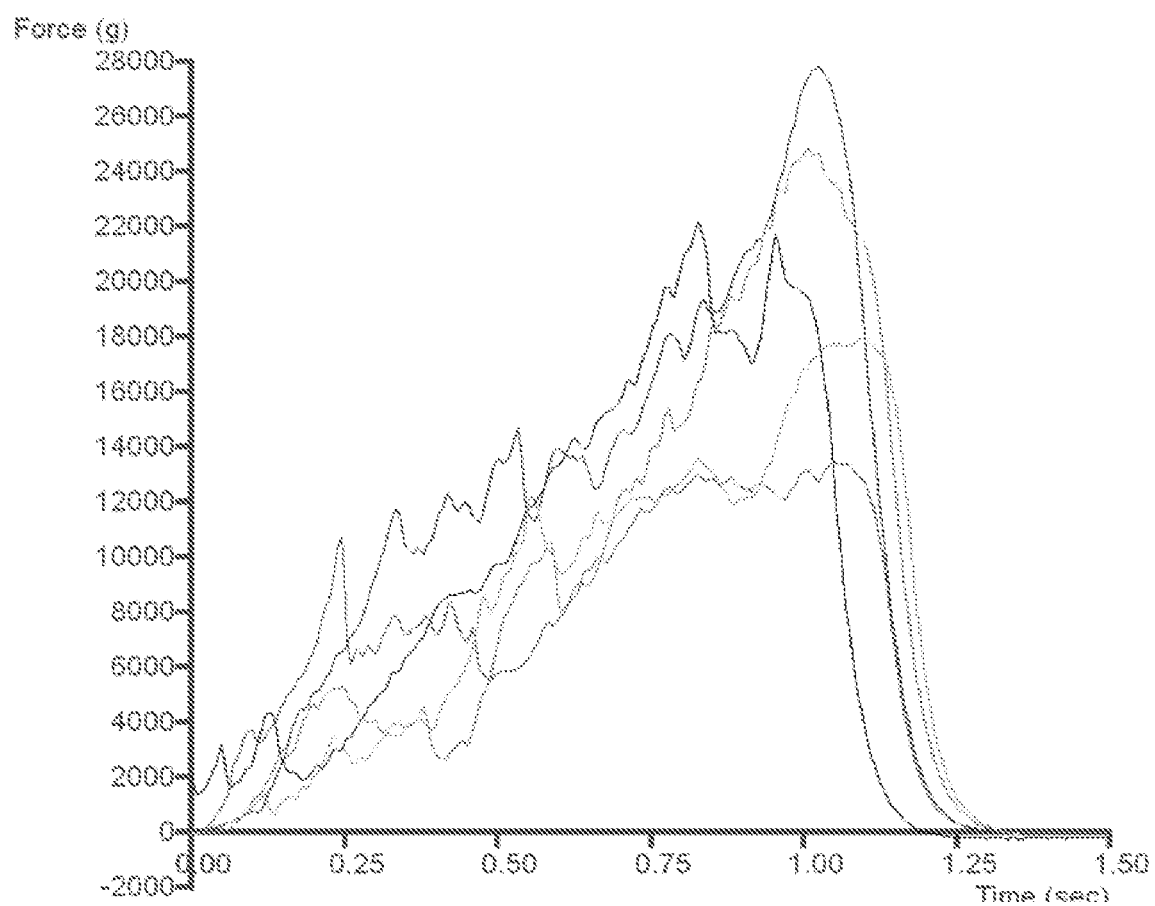
FIG. 4 is an example graph indicating example textural characteristics of popped popcorn coated with the coating.
Figure 5:
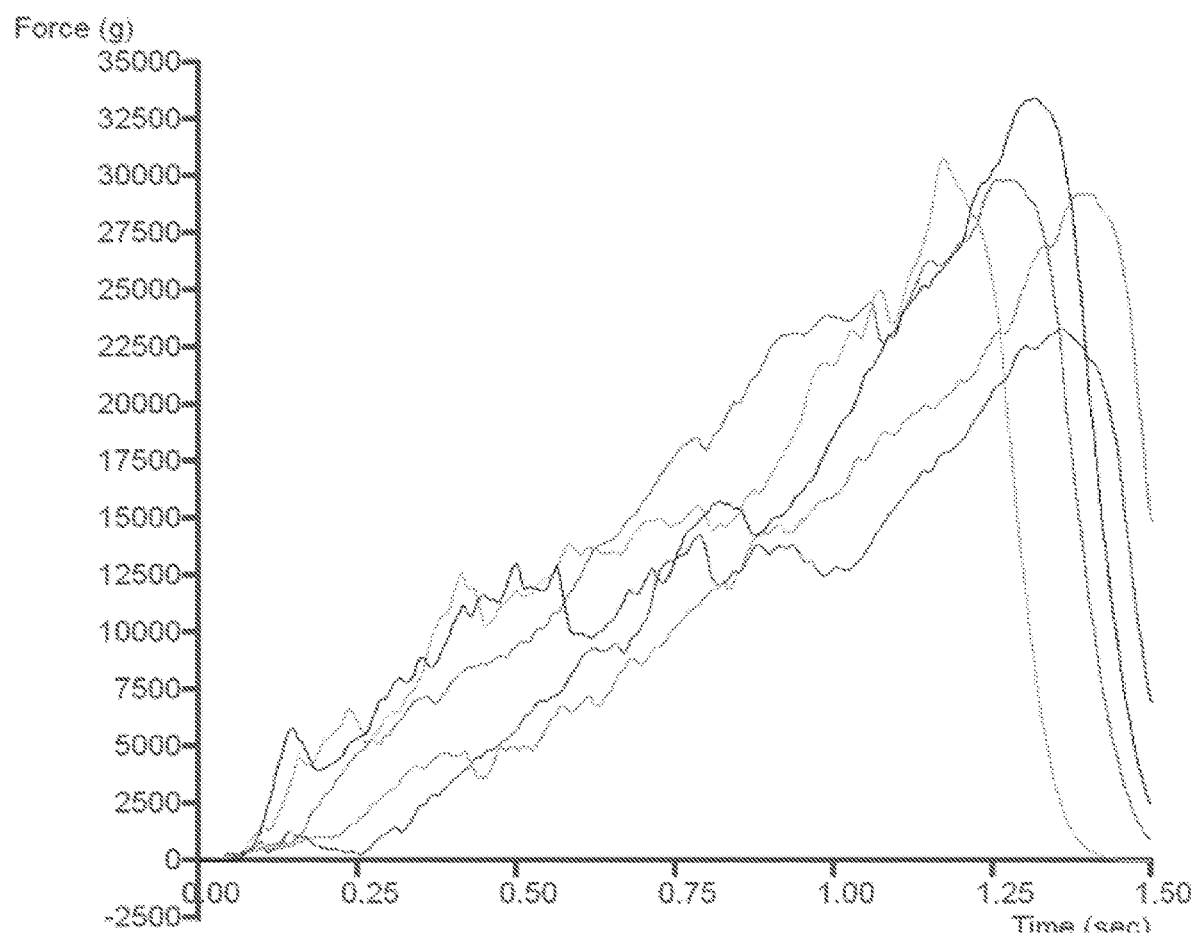
FIG. 5 is an example graph indicating example textural characteristics of popped popcorn coated with the coating and a topical component.

FIGS. 3-5 are textual analysis graphs. The product tested in FIG. 3 was uncoated, popped popcorn. The product tested in FIG. 4 includes popped popcorn coated with the coating formulation in TABLE B. The coating formulation was mixed with the popped popcorn and cornflakes were added into the mix before the coating formulation transitioned to its glass state. The product tested in FIG. 5 includes popped popcorn coated with the coating formulation in TABLE B. The coating formulation was mixed with the popped popcorn and cornflakes were added into the mix before the coating formulation transitioned to its glass state. After the coating formulation formed its glass state to adhere the cornflake particulates, the product was lightly sprayed with oil and a seasoning was adhered to the product.

The texture was measured by a TA-XT2 texture analyzer manufactured by Stable Micro Systems. Five popcorn kernels from each sample set indicated above were placed in a punched plate fixture and were crushed by a 76.2 mm diameter acrylic plate. The punch plate fixture was made from an aluminum block (101.6 mm×89 mm×35 mm). A 77.4 mm diameter hole was drilled 22.2 mm into the block. Sixty one 6.3 mm holes were drilled in a circular pattern through the bottom of the block. Prior to the start of the test, the acrylic plate was lowered so it was just touching the top of the kernels. The texture analyzer moved the plate downward at a speed of 10 mm/s for a strain of 50% (e.g., the fixture compresses the samples by 50%). Each of FIGS. 3-5 represents five runs.

In comparing FIGS. 3-5, the product indicated in FIG. 3 has an average of about 0.1 additional peaks during the compression period. The product indicated in FIG. 4 has an average of about 7.3 additional peaks during the compression period. The product indicated in FIG. 5 has an average of about 9.0 additional peaks during the compression period. The peaks represent the crispiness of the product as the sample is compressed.

5. Humectants Analysis of Coating Formula on Popped Popcorn Product

The purpose of the Humectants analysis was to determine whether coating formulation reduces moisture pickup in the popcorn compared to plain popcorn and popcorn with oil and dry seasoning. Five popcorn samples of each type were placed into a chamber having a temperature of 71.6° F. and a relative humidity of 73%. The samples were tested as indicated below over a 14-day period to determine percentage of weight gain from day-to-day. Any weight gain was assumed to be from moisture.

TABLE E

| Day | Plain | Seasoned | Coating Formula |
|---|---|---|---|
| Day 1 | 0.5% | 0.3% | 0.2% |
| Day 2 | 0.9% | 0.6% | 0.5% |
| Day 3 | 1.2% | 0.9% | 0.7% |
| Day 4 | x | x | x |
| Day 5 | x | x | x |
| Day 6 | 2.0% | 1.7% | x |
| Day 7 | 2.3% | 2.0% | 1.5% |
| Day 8 | 2.6% | 2.2% | 1.7% |
| Day 9 | 2.8% | 2.5% | 1.9% |
| Day 10 | 3.0% | 2.6% | 2.1% |
| Day 11 | x | x | x |
| Day 12 | x | x | x |
| Day 13 | x | x | x |
| Day 14 | 4.0% | 3.2% | 2.9% |

As indicated above, the coating formulation has significantly less moisture pick up after day 2. At day 14, the coating formulation picks up 27.5% less moisture than plain popcorn and 9.3% less moisture than seasoned popcorn.

6. Topical Component Adherence on Popped Popcorn Product

The purpose of the Topical Component Adherence test was to determine whether the coating formulation provides for a better adherence of topical components then plain popcorn. As indicated below in TABLE C, popcorn coated with the coating formulation was compared to plain flake popcorn and plain mushroom popcorn. The oil percentages in relation to the total formulation were used to adhere the topical component to the respective samples. For each sample type, about 1800 pieces of popcorn were used, 113 grams of a topical component was utilized.

TABLE G

| Oil % | Plain Flake LS Mean | Plain Mushroom LS Mean | Coating Formulation LS Mean |
|---|---|---|---|
| 10 | 90.70% | 89.00% | 98.20% |
| 20 | 92.60% | 91.10% | 98.70% |
| 30 | 91.90% | 93.00% | 99.30% |

As indicated above, popcorn with the coating formulation adheres between about 6% and about 9% more of a topical component than plain flakes with respective oil levels. Moreover, the coating formulation sample at 10% oil has over 6% greater topical component adherence than a plain flake at 30% oil. Similarly, the coating formulation sample at 10% oil has over 5% greater topical component adherence than a plain mushroom at 30% oil.

7. Example Combinations

TABLE H below includes a few example combinations of ingredients that can be formed with the coating formation to produce an agglomerated finished food product.

TABLE H

| Ingredient | Grams | Percent |
|---|---|---|
| Combination 1 | | |
| puffed food | 100.1 | 32.3 |
| coating formulation | 165 | 53.2 |
| cheese cracker | 45.2 | 14.6 |
| Total | 310.3 | 100 |
| Combination 2 | | |
| pretzel | 75 | 32.6 |
| coating formation | 100 | 43.4 |
| peanuts | 55.3 | 24 |
| Total | 230.3 | 100 |
| Combination 3 | | |
| cheese puffs | 50.2 | 20.4 |
| coating formulation | 150 | 61.1 |
| artificial bacon pieces | 45.3 | 18.5 |
| Total | 245.5 | 10 |
| Combination 4 | | |
| pretzel balls | 201 | 46 |
| candy | 135 | 30.9 |
| puffed cereal square | 101 | 23.1 |
| Total | 437 | 100 |
| Combination 5 | | |
| puffed food | 100 | 27 |
| coating formulation | 180 | 48.6 |
| cheese cracker | 90 | 24.3 |
| Total | 370 | 100 |
| Combination 6 | | |
| pretzel balls | 201 | 46 |
| candy | 135 | 30.9 |
| puffed cereal square | 101 | 23.1 |
| Total | 437 | 100 |

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A popped popcorn product having a low-sweetness perception, the popped popcorn product comprising:
   popped popcorn; and
   a coating, wherein the coating includes:
      maltodextrin from about 35% to about 50% by total weight of the coating,
      sugar alcohol from about 10% to about 30% by total weight of the coating,
      a sweetness inhibitor from about 0.1% to about 5.0% by total weight of the coating,
   wherein the sweetness inhibitor includes at least one member of a group consisting of: a carboxylic acid and a gymnemic acid, and
      wherein the coating has a dextrose equivalent that is less than about 30 and a sweetness value for a 10% concentration of the coating is about half as sweet as a 5% concentration of sucrose.

2. The popped popcorn product of claim 1, wherein the sugar alcohol includes isomalt.

3. The popped popcorn product of claim 1, wherein the sugar alcohol includes at least one member of a group consisting of: lactitol, hydrogenated starch hydrolysates, mannitol, glycerol, sorbitol, arabitol, erythritol, maltitol, and xylitol.

4. The popped popcorn product of claim 1, wherein the coating further comprises an oil.

5. The popped popcorn product of claim 1, wherein the coating further comprises a saccharide.

6. The popped popcorn product of claim 5, wherein the saccharide includes dextrose.

7. The popped popcorn product of claim 1, wherein the coating further comprises lecithin.

8. A coating, the coating having a low-sweetness perception and comprising:
   maltodextrin from about 35% to about 50% by total weight of the coating;
   sugar alcohol from about 10% to about 30% by total weight of the coating;
   a sweetness inhibitor from about 0.1% to about 5% by total weight of the coating, wherein the sweetness inhibitor includes at least one member of a group consisting of: a carboxylic acid and a gymnemic acid; and
   wherein the coating has a dextrose equivalent that is less than about 30 and a sweetness value for a 10% concentration of the coating is about half as sweet as a 5% concentration of sucrose.

9. The coating of claim 8, further comprising oil.

10. The coating of claim 8, further comprising a saccharide.

11. The coating of claim 10, wherein the saccharide includes dextrose.

12. The coating of claim 8, further comprising lecithin.

13. The coating of claim 12, wherein the lecithin includes a deflavored lecithin.

14. A process for making a coated food product with a low-sweetness perception, the process comprising:
   heating a coating composition to form a glaze state of the composition, wherein the glaze state of the composition comprises:
      maltodextrin from about 35% to about 50% by total weight of the glaze state of the composition,
      sugar alcohol from about 10% to about 30% by total weight of the glaze state of the composition, and
      a sweetness inhibitor from about 0.1% to about 5.0% by total weight of the glaze state of the composition, wherein the sweetness inhibitor includes at least one member of a group consisting of: a carboxylic acid and a gymnemic acid,
      wherein the glaze state of the composition has a viscosity that is less than about 50,000 centipoises at temperatures less than about 325° F. and a sweetness value for a 10% concentration of the coating composition is about half as sweet as a 5% concentration of sucrose;
   applying the glaze state of the composition to the surface of food to form the coated food product; and
   cooling the coated food product to facilitate a glass state of the coating composition.

15. The process of claim 14, further comprising applying a non-stick ingredient while the glaze state of the composition is being applied to the surface of the food.

16. The process of claim 15, wherein the non-stick ingredient includes lecithin.

17. The Process process of claim 14, wherein the process includes a screw-type conveyance mixer.

18. The process of claim 14, wherein the sugar alcohol is isomalt.

19. The process of claim 14, wherein the sugar alcohol is at least one member of a group consisting: lactitol, hydrogenated starch hydrolysates, mannitol, glycerol, sorbitol, arabitol, erythritol, maltitol, and xylitol.

20. The process of claim 14, wherein the composition includes saccharide.

* * * * *